(12) United States Patent
Srirattana et al.

(10) Patent No.: US 9,705,558 B2
(45) Date of Patent: Jul. 11, 2017

(54) HARMONIC REJECTED ANTENNA SWITCH

(75) Inventors: Nuttapong Srirattana, Billerica, MA (US); Brian White, Greensboro, NC (US); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 1700 days.

(21) Appl. No.: 13/022,840

(22) Filed: Feb. 8, 2011

(65) Prior Publication Data

US 2012/0200473 A1    Aug. 9, 2012

(51) Int. Cl.
*H04B 1/48* (2006.01)

(52) U.S. Cl.
CPC ..................... *H04B 1/48* (2013.01)

(58) Field of Classification Search
CPC ........................................ H01Q 3/24
USPC ........................................ 343/876
See application file for complete search history.

(56) References Cited

U.S. PATENT DOCUMENTS

| | | | | |
|---|---|---|---|---|
| 5,630,213 | A * | 5/1997 | Vannatta | 455/133 |
| 6,600,385 | B2 * | 7/2003 | Harada et al. | 333/101 |
| 2002/0021182 | A1 * | 2/2002 | Harada et al. | 333/101 |
| 2004/0198298 | A1 * | 10/2004 | Waight et al. | 455/333 |
| 2010/0073066 | A1 * | 3/2010 | Seshita et al. | 327/427 |
| 2010/0157858 | A1 * | 6/2010 | Lee et al. | 370/297 |
| 2012/0306716 | A1 * | 12/2012 | Satake et al. | 343/841 |

OTHER PUBLICATIONS

Tsukahara, Y. et al., "60 GHz High Isolation SPDT MMIC Switches Using Shunt pHEMT Resonator," 2008 Microwave Symposium Digest, Jun. 15-20, 2008, pp. 1541-1544, IEEE.
Park, P. et al., "A High-Linearity, LC-Tuned, 24-GHz T/R Switch in 90-nm CMOS," 2008 Radio Frequency Integrated Circuits Symposium, Jun. 17, 2008-Apr. 17, 2008, pp. 369-372, IEEE.
Lee, J. et al., "A Q-band Low Loss Reduced-Size Filter-Integrated SPDT Switch Using 0.15μm MHEMT Technology," 2008 Microwave Symposium Digest, Jun. 15-20, 2008, pp. 551-554, IEEE.
Tsai, Z. et al., "Analysis and Design of Bandpass Single-Pole-Double-Throw FET Filter-Integrated Switches," IEEE Transactions on Microwave Theory and Techniques, Aug. 2007, pp. 1601-1610, vol. 55, No. 8, IEEE.
Fu, C. et al., "A 5-GHz, 30-dBm, 0.9-dB Insertion Loss Single-Pole Double-Throw T/R Switch in 90nm CMOS," 2008 Radio Frequency Integrated Circuits Symposium, Jun. 17, 2008-Apr. 17, 2008, pp. 317-320, IEEE.

* cited by examiner

*Primary Examiner* — Dameon E Levi
*Assistant Examiner* — Andrea Lindgren Baltzell
(74) *Attorney, Agent, or Firm* — Withrow & Terranova, P.L.L.C.

(57) ABSTRACT

The exemplary embodiments include a radio frequency antenna switch configured to reject harmonic frequencies. In addition, the harmonic-rejected radio frequencies of the radio frequency antenna switch may be tuned by use of a capacitor array. The capacitor array may be configured with fuse elements or by control logic.

3 Claims, 7 Drawing Sheets

HARMONIC REJECTED ANTENNA SWITCH

FIELD OF THE DISCLOSURE

Embodiments described herein relate to radio frequency switches. In addition, the embodiments described herein are further related to antenna switches.

BACKGROUND

The conventional state-of-the-art antenna switch consists of a set of series field effect transistors (FETs) and a single antenna bond wire connecting the common node to the antenna. The FET devices are electrically nonlinear and generate harmonic contents. Conventional inductor-capacitor (LC) filters can be used to filter out harmonics, but an LC filter has limitations in a single-ended switch where the on-chip capacitor is susceptible to electrostatic discharge (ESD) damage when one side of the capacitor is grounded.

Accordingly, there is a need to develop a radio frequency antenna switch that rejects harmonic frequencies generated by the switch devices and is not susceptible to electromagnetic discharge damage.

SUMMARY

The embodiments described in the detailed description relate to radio frequency antenna switches that reject harmonic frequencies generated by the switch devices. In particular, the exemplary embodiments use a harmonic-rejection topology with a set of radio frequency switches to create a harmonic-rejected multiport radio frequency antenna switch. In addition, the harmonic-rejected radio frequencies of the radio frequency antenna switch may be tuned by use of one or more capacitor arrays. The capacitor arrays may each be configured with fuse elements or by control logic.

A first exemplary embodiment of a multiport radio frequency switch includes a first set of switches, a second set of switches, and an antenna port configured to couple to an antenna. The multiport radio frequency switch further includes a first inductor and a second inductor. The first end of the first inductor is electrically coupled to the antenna port, and the second end of the first inductor is electrically coupled to the first set of switches. The second inductor has a first end and a second end, where the first end of the second inductor is electrically coupled to the antenna port, and the second end of the second inductor is electrically coupled to the second set of switches. A capacitor has a first end and a second end, where the first end of the capacitor is electrically coupled to the second end of the first inductor, and the second end of the capacitor is electrically coupled to the second end of the second inductor.

Another embodiment of the multiport radio frequency switch includes an antenna port configured to couple with an antenna, a first set of switches, and a second set of switches. A first inductor has a first node electrically coupled to the antenna port and a second node electrically coupled to the first set of switches. A second inductor has a first node electrically coupled to the antenna port and a second node electrically coupled to the second set of switches. A third inductor including a first node electrically coupled to the antenna port and a second node. A first capacitor has a first node electrically coupled to the second node of the first inductor and a second node electrically coupled to the second node of the third inductor. A second capacitor has a first node electrically coupled to the second node of the second inductor and a second node electrically coupled to the second node of the third inductor.

Another embodiment of a multiport radio frequency switch includes an antenna port configured to couple with an antenna, a first inductor electrically coupled between the antenna port and a first radio frequency switch, a second inductor electrically coupled between the antenna port and a second radio frequency switch, a third inductor electrically coupled between the antenna port and a third radio frequency switch, and a fourth inductor electrically coupled between the antenna port and a fourth radio frequency switch. A first capacitor is electrically coupled between the first radio frequency switch and the second radio frequency switch. A second capacitor is electrically coupled between the second radio frequency switch and the third radio frequency switch. A third capacitor is electrically coupled between the third radio frequency switch and the fourth radio frequency switch. A fourth capacitor is electrically coupled between the fourth radio frequency switch and the first radio frequency switch.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
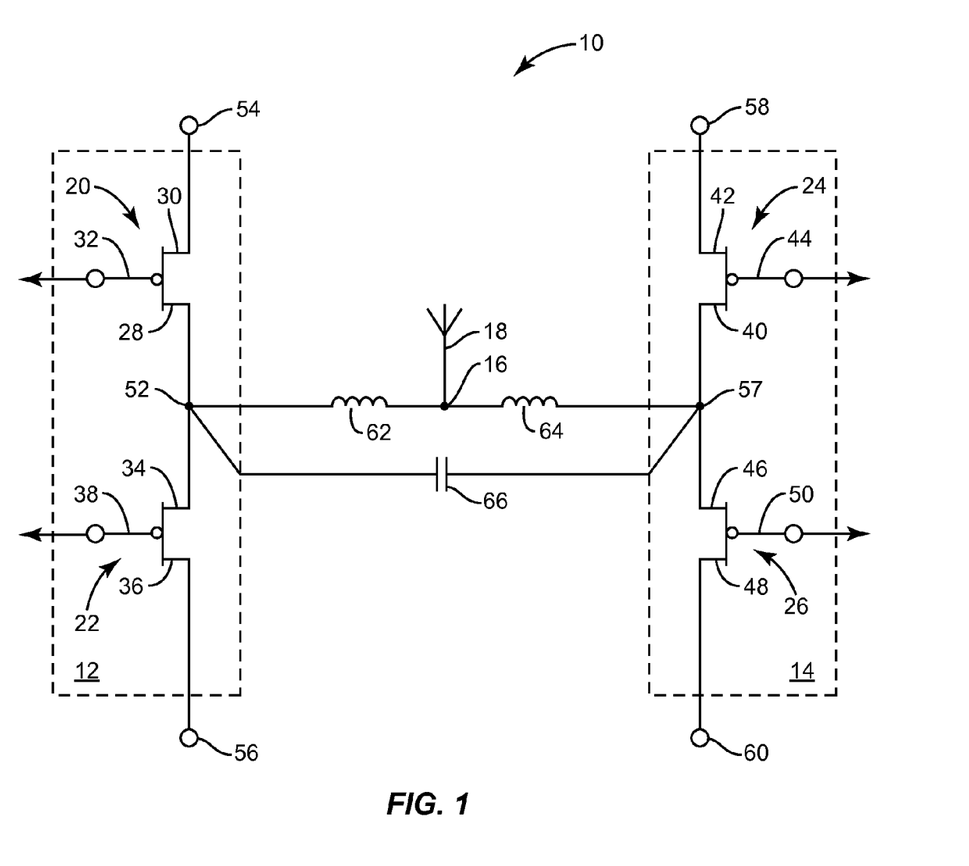
FIG. 1 depicts a harmonic-rejected four port antenna switch.

FIG. 1 depicts a harmonic-rejected four port antenna switch 10, which depending upon component selection, may provide a second or third harmonic filter. The harmonic-rejected antenna switch 10 includes a first set of switches 12, a second set of switches 14, an antenna port 16 configured to couple to an antenna 18. The first set of switches 12 includes a first switch 20 coupled to a second switch 22. The second set of switches 14 may include a third switch 24 coupled to a fourth switch 26. The first switch 20, the second switch 22, the third switch 24, and the fourth switch 26 may be field effect transistor (FET) switches. As an example, the first switch 20, the second switch 22, the third switch 24, and the fourth switch 26 may be a pHEMT switch or asilicon on insulator (SOI) switch. Although the harmonic-rejected antenna switch 10 is depicted as having four switches, other embodiments may include more or less than four switches.

The first switch 20 may include a first terminal 28, a second terminal 30, and a first control terminal 32. The second switch 22 may include a first terminal 34, a second terminal 36, and a second control terminal 38. The third switch 24 may include a first terminal 40, a second terminal 42, and a third control terminal 44. The fourth switch 26 may include a first terminal 46, a second terminal 48 and a fourth control terminal 50.

The first terminal 28 of the first switch 20 may be coupled to a first terminal 34 of the second switch 22 to form a first node 52 of the first set of switches 12. The second terminal 30 of the first switch 20 may form a first port 54 of the harmonic-rejected antenna switch 10. The second terminal of the second switch 22 may form a second port 56 of the harmonic-rejected antenna switch 10.

The first terminal 40 of the third switch 24 may be coupled to the first terminal 46 of the fourth switch 26 to form a second node 57 of the second set of switches 14. The second terminal 42 of the third switch 24 may form a third port 58 of the harmonic-rejected antenna switch 10. The second terminal 48 of the fourth switch 26 may form a fourth port 60 of the harmonic-rejected antenna switch 10.

As further depicted in FIG. 1, a first inductor 62 couples between the antenna port 16 and the first node 52 of the first set of switches 12. A second inductor 64 couples between the antenna port 16 and the second node 57 of the second set of switches 14. The first inductor 62 and the second inductor 64 may be bond wires trimmed to provide a desired inductance. A capacitor 66 is coupled between the first node 52 of the first set of switches 12 and the second node 57 of the second set of switches 14. The capacitor 66 may include multiple capacitors arranged to form a capacitor array. As discussed below, in some embodiments, one or more of the capacitors may be combined with a fusing element (not shown) to create a fused capacitor. The fused capacitor may be configured to remove or add to the effective capacitance of capacitor 66.

Figure 6:
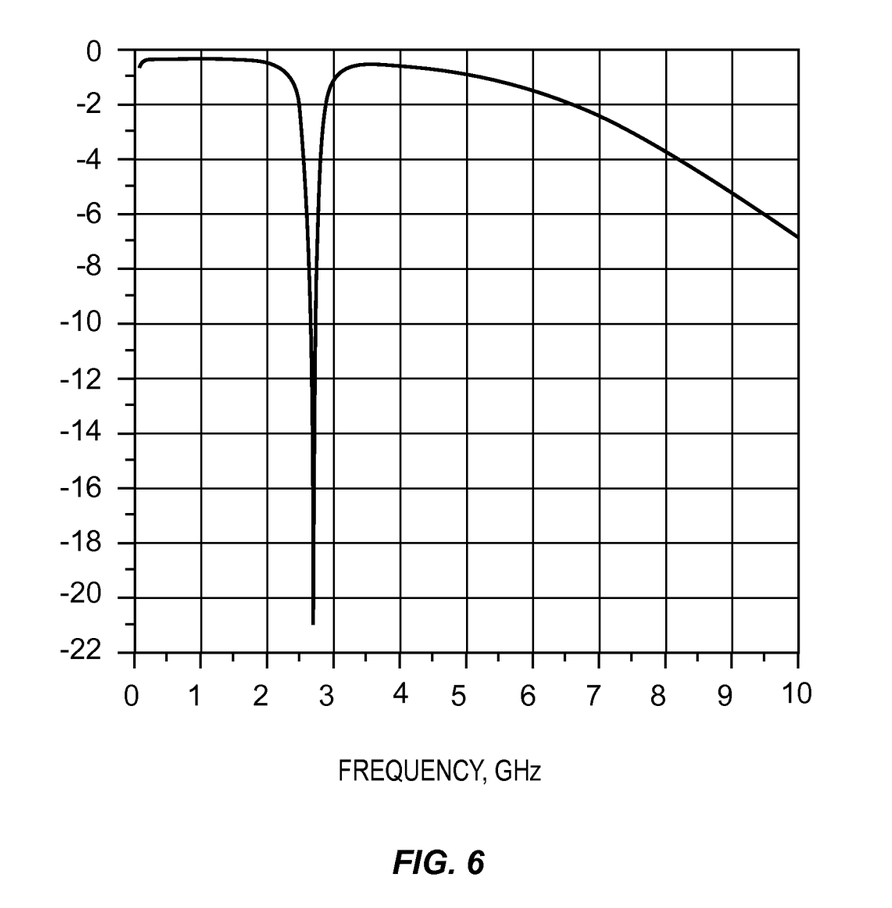
FIG. 6 depicts an example insertion loss response of the harmonic-rejected antenna switch of FIG. 1.

FIG. 6 depicts a response of the harmonic-rejected four port antenna switch 10 of FIG. 1. As depicted in FIG. 6, at 900 MHz there is obviously no difference in insertion loss; however, at 2.7 GHz (third harmonic) there is a notch of 21.6 dB.

Figure 2:
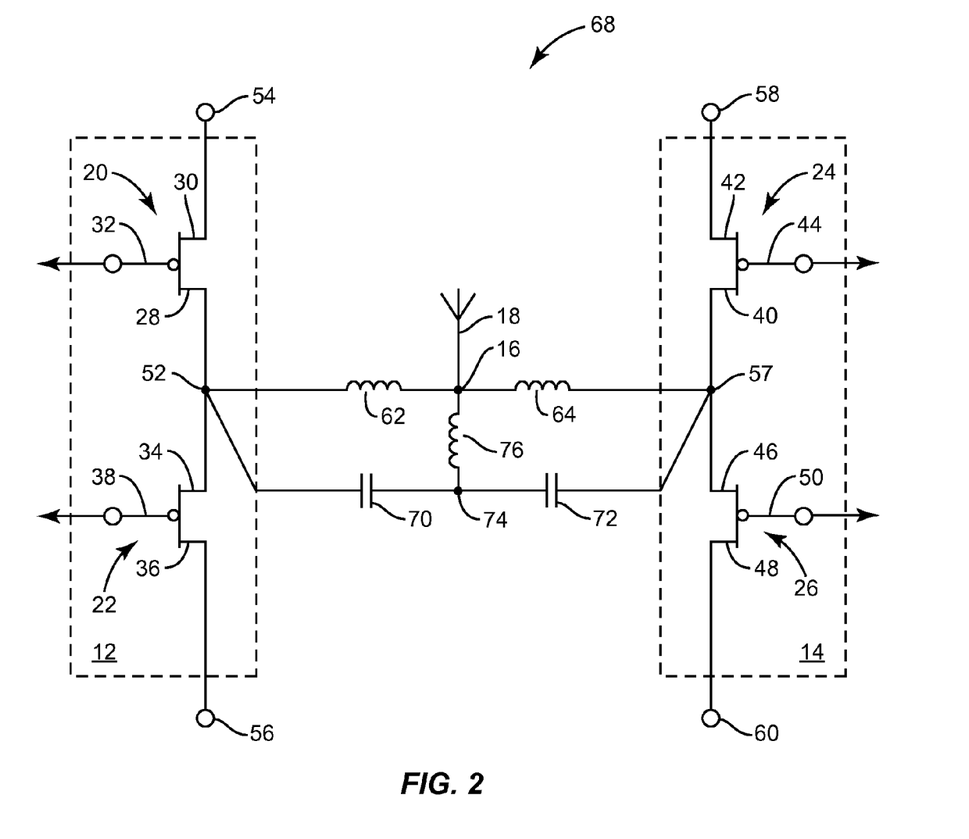
FIG. 2 depicts a two-section harmonic-rejected four port antenna switch.

FIG. 2 depicts a two-section harmonic-rejected four port antenna switch 68. Similar to the harmonic-rejected antenna switch 10 of FIG. 1, the two-section harmonic-rejected four port antenna switch 68 includes the first set of switches 12 and the second set of switches 14. In addition, the first inductor 62 couples between the antenna port 16 and the first node 52 of the first set of switches 12. A second inductor 64 couples between the antenna port 16 and the second node 57 of the second set of switches 14.

In contrast to the harmonic-rejected antenna switch 10 of FIG. 1, the two-section harmonic-rejected four port antenna switch 68 of FIG. 2 includes a first capacitor 70 coupled to a second capacitor 72 to form a third node 74. In addition, the first capacitor 70 is coupled to the first node 52 of the first set of switches 12. The second capacitor 72 is coupled to the second node 57 of the second set of switches 14. A third inductor 76 is coupled between the antenna port 16 and the third node 74. This forms a higher order filter topology that can reject the third and fifth harmonics.

Figure 7:
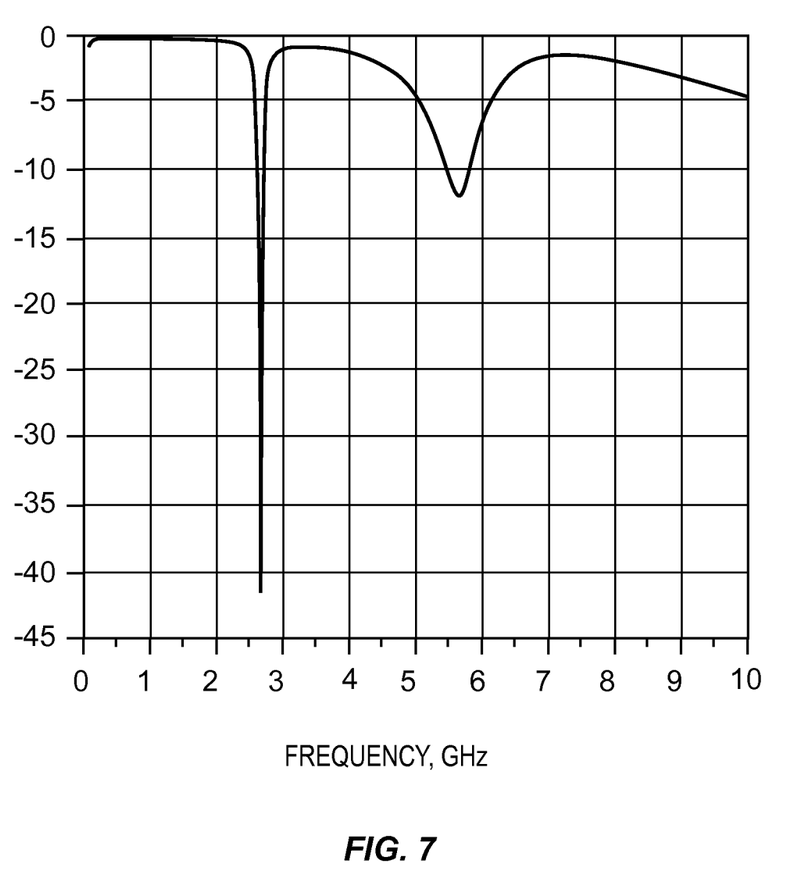
FIG. 7 depicts an example insertion loss of a two-section harmonic-rejected four port antenna switch of FIG. 2.

FIG. 7 depicts an example insertion loss frequency response of the two-section harmonic-rejected four port antenna switch 68, depicted in FIG. 2. In addition to rejecting the third harmonic at 2.7 GHz, the fifth harmonic at 5.7 GHz is also attenuated.

Figure 3:
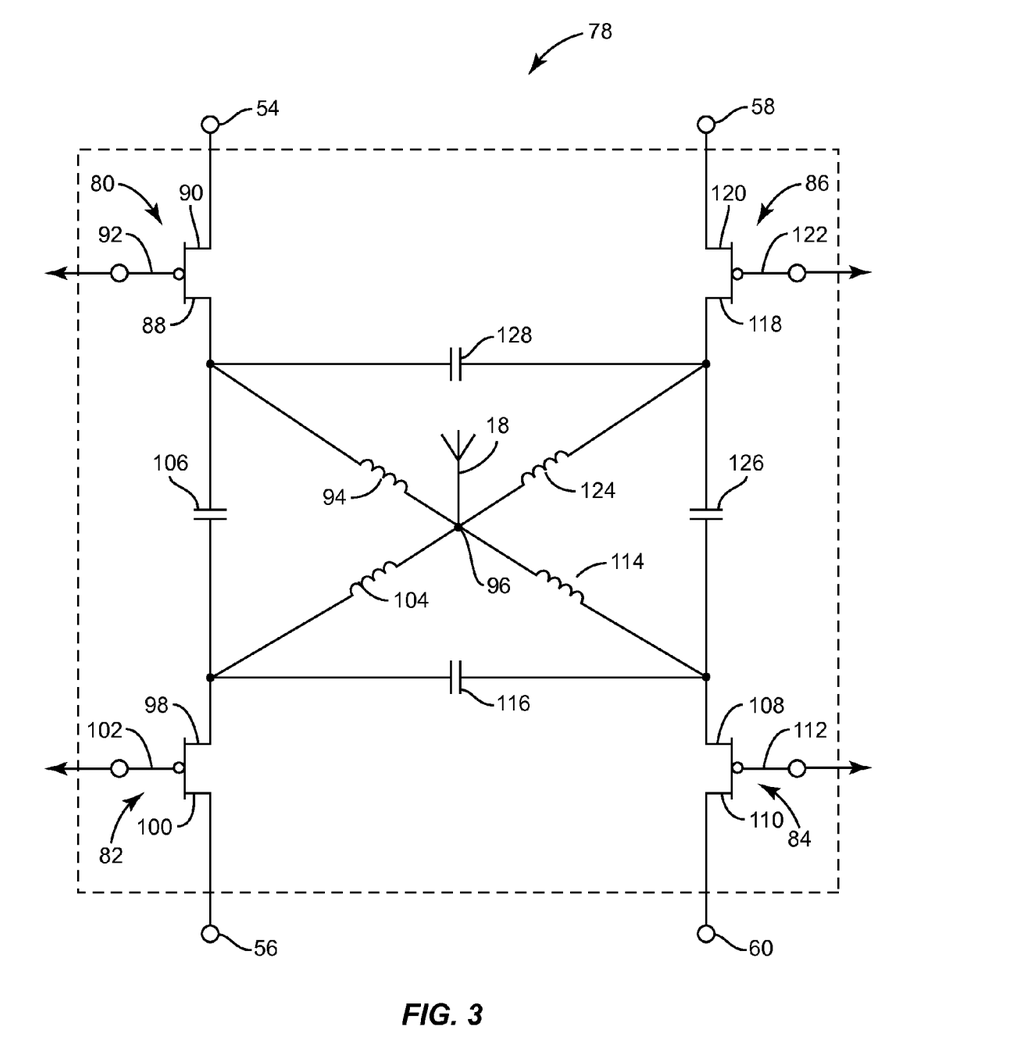
FIG. 3 depicts a four-section harmonic-rejection antenna switch.

FIG. 3 depicts a four-section harmonic-rejection antenna switch 78, which includes a first switch 80, a second switch 82, a third switch 84, and a fourth switch 86. The first switch 80 includes a first terminal 88, a second terminal 90, and a control terminal 92. The first terminal 88 of the first switch 80 is coupled to a first inductor 94. The first inductor is also coupled to an antenna port 96.

The second switch 82 includes a first terminal 98, a second terminal 100 and a control terminal 102. The first terminal 98 of the second switch 82 is coupled to a second inductor 104. The second inductor 104 is also coupled to the antenna port 96. A first capacitor 106 is coupled between the first terminal 88 of the first switch 80 and the first terminal 98 of the second switch 82.

The third switch 84 includes a first terminal 108, a second terminal 110, and a control terminal 112. The first terminal 108 of the third switch 84 is coupled to a third inductor 114. The third inductor 114 is also coupled to the antenna port 96. A second capacitor 116 is coupled between the first terminal 98 of the second switch 82 and the first terminal 108 of the third switch 84.

The fourth switch 86 includes a first terminal 118, a second terminal 120, and a control terminal 122. The first terminal 118 of the fourth switch 86 is coupled to a fourth inductor 124. The fourth inductor 124 is also coupled to the antenna port 96. A third capacitor 126 is coupled between the first terminal 108 of the third switch 84 and the first terminal 118 of the fourth switch 86. A fourth capacitor 128 is coupled between the first terminal 88 of the first switch 80 and the first terminal 118 of the fourth switch 86.

Figure 4:
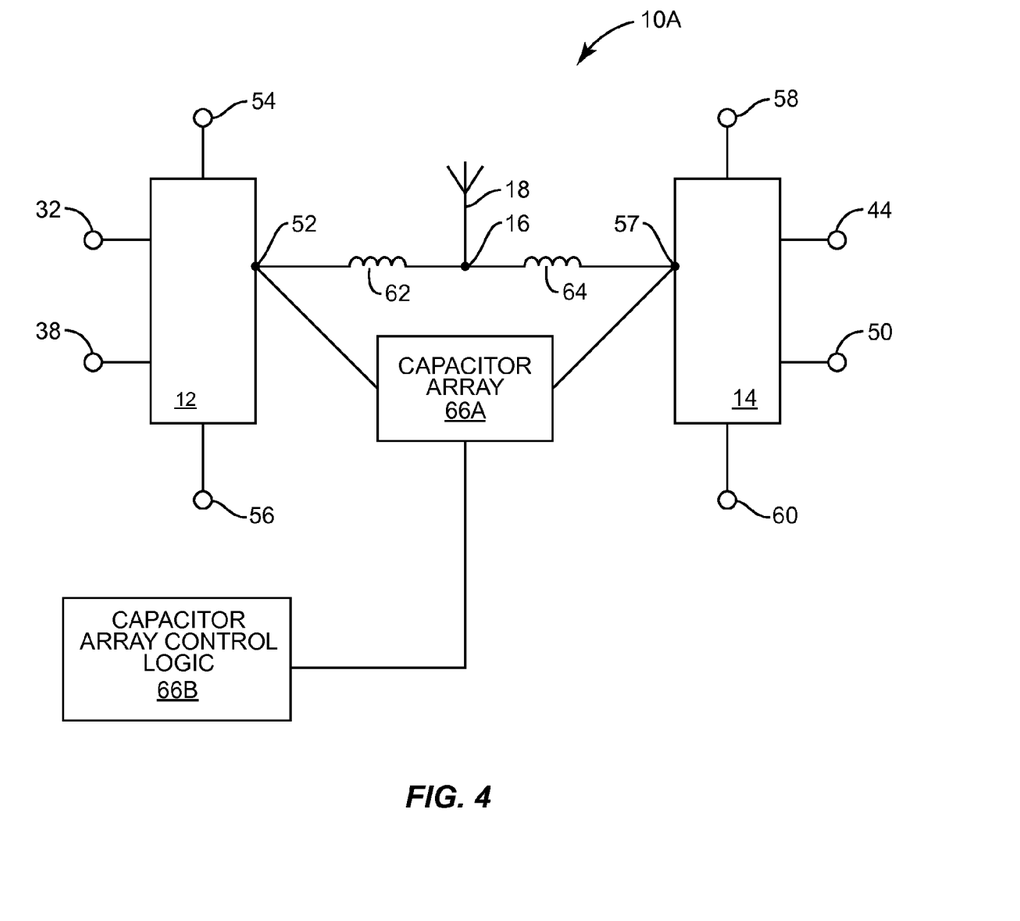
FIG. 4 depicts a harmonic-rejected four port antenna switch having a capacitor array governed by control logic.
Figure 5:
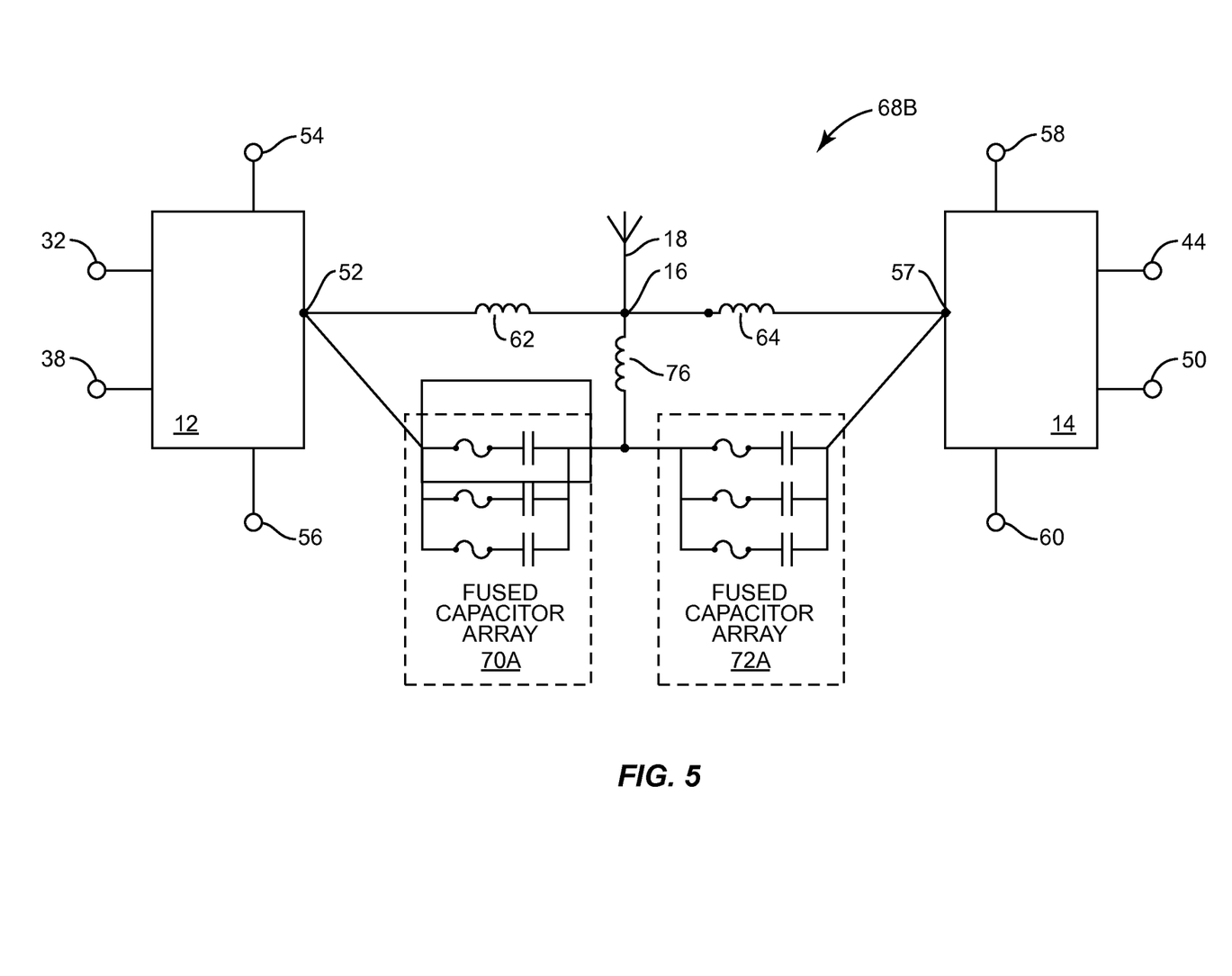
FIG. 5 depicts a harmonic-rejected four port antenna switch having a capacitor array controlled with one or more fusing mechanisms.

To provide design flexibility during production, at least some of the capacitors may be configured as an array of capacitors. For example, each of the capacitors may be a capacitor array. As a further example, the capacitor array may be a binary weighted capacitor array. FIG. 4 depicts an example of the circuit of FIG. 1 having a capacitor array 66A instead of capacitor 66. Capacitor array control logic 66B controls may be coupled to the capacitor array and configured to control which of the capacitors in the capacitor array are active. FIG. 5 depicts an alternative embodiment of FIG. 2 where the first capacitor 70 and the second capacitor 72 are replaced by a first fused capacitor array 70A and a second fused capacitor array 72A. In some embodiments, the fused capacitor array may include fuses that may be used to remove a capacitor in the array from the electrical circuit. Other embodiments may include anti-fuses that may be fused to put a capacitor of the capacitor array into the electrical circuit.

Those skilled in the art will recognize improvements and modifications to the embodiments of the present disclosure. All such improvements and modifications are considered within the scope of the concepts disclosed herein and the claims that follow.

What is claimed is:
1. A multiport radio frequency switch comprising:
a first plurality of switches;
a second plurality of switches;
an antenna port configured to couple to an antenna;
a first inductor having a first end and a second end, the
  first end of the first inductor electrically coupled to the antenna port, and the second end of the first inductor electrically coupled to the first plurality of switches;

a second inductor having a first end and a second end, the first end of the second inductor electrically coupled to the antenna port, and the second end of the second inductor electrically coupled to the second plurality of switches;

a capacitor array having a first end and a second end, the first end of the capacitor array electrically coupled to the second end of the first inductor, and the second end of the capacitor array coupled to the second end of the second inductor, wherein the first inductor and the second inductor are configured in series to form an inductor series, and wherein the capacitor array is configured in parallel with the inductor series.

2. The multiport radio frequency switch of claim 1 wherein the capacitor array is a programmable capacitor array.

3. The multiport radio frequency switch of claim 2 wherein the programmable capacitor array is coupled to control logic, wherein the control logic is configured to program the programmable capacitor array.

* * * * *